United States Patent
Fong et al.

(10) Patent No.: US 9,950,758 B2
(45) Date of Patent: Apr. 24, 2018

(54) SYSTEMS AND METHODS FOR A TURBINE TRAILER MECHANICAL DOCKING AND ALIGNMENT SYSTEM

(71) Applicant: General Electric Company, Schenectady, NY (US)

(72) Inventors: Raymond Ka Lok Fong, Houston, TX (US); Robert Allen Baten, Baytown, TX (US)

(73) Assignee: General Electric Company, Schenectady, NY (US)

( * ) Notice: Subject to any disclaimer, the term of this patent is extended or adjusted under 35 U.S.C. 154(b) by 697 days.

(21) Appl. No.: 14/489,323

(22) Filed: Sep. 17, 2014

(65) Prior Publication Data

US 2016/0075387 A1    Mar. 17, 2016

(51) Int. Cl.

| | |
|---|---|
| *B60D 1/36* | (2006.01) |
| *B62D 63/08* | (2006.01) |
| *B62D 53/04* | (2006.01) |
| *G01S 17/08* | (2006.01) |
| *G01S 17/93* | (2006.01) |
| *B60D 1/62* | (2006.01) |
| *B60D 1/64* | (2006.01) |
| *F01D 15/10* | (2006.01) |
| *F02C 7/36* | (2006.01) |
| *F01D 21/00* | (2006.01) |
| *F01D 25/28* | (2006.01) |

(52) U.S. Cl.
CPC .............. *B62D 63/08* (2013.01); *B60D 1/36* (2013.01); *B60D 1/62* (2013.01); *B60D 1/64* (2013.01); *B62D 53/04* (2013.01); *F01D 15/10* (2013.01); *F01D 21/003* (2013.01); *F02C 7/36* (2013.01); *G01S 17/08* (2013.01); *G01S 17/936* (2013.01); *F01D 25/285* (2013.01); *F05D 2240/90* (2013.01); *F05D 2260/403* (2013.01)

(58) Field of Classification Search
CPC .......... B62D 63/08; B62D 53/04; B60D 1/36; B60D 1/62; B60D 1/64
See application file for complete search history.

(56) References Cited

U.S. PATENT DOCUMENTS

| | | |
|---|---|---|
| 3,907,435 A | 9/1975 | Roodvoets |
| 4,992,669 A | 2/1991 | Parmley |

(Continued)

FOREIGN PATENT DOCUMENTS

WO    2008091549 A1    7/2008

OTHER PUBLICATIONS

PCT Invitation to Pay Additional Fees issued in connection with corresponding PCT Application No. PCT/US2015/48421 dated Nov. 24, 2015.

(Continued)

*Primary Examiner* — Daniel J Wiley
(74) *Attorney, Agent, or Firm* — Fletcher Yoder, P.C.

(57) ABSTRACT

A system includes a docking guide comprising a first alignment guide configured to couple with a first mobile unit that supports a turbine engine and a second alignment guide configured to couple with a second mobile unit that supports a generator. The first and second alignment guides are configured to guide a coupling between the first and second mobile units to help align the turbine engine with the generator.

20 Claims, 8 Drawing Sheets

(56) References Cited

U.S. PATENT DOCUMENTS

| | | | | |
|---|---|---|---|---|
| 5,450,226 | A * | 9/1995 | Khan | H04B 10/1143 246/166.1 |
| 5,684,578 | A | 11/1997 | Nower et al. | |
| 6,259,357 | B1 * | 7/2001 | Heider | B60D 1/36 280/477 |
| 6,266,143 | B1 | 7/2001 | Peterson et al. | |
| 6,736,216 | B2 | 5/2004 | Savard et al. | |
| 7,171,769 | B2 * | 2/2007 | Schultz | B60D 1/36 172/272 |
| 7,195,267 | B1 * | 3/2007 | Thompson | B60D 1/36 280/477 |
| 7,293,308 | B2 | 11/2007 | Everett et al. | |
| 7,478,801 | B2 | 1/2009 | Cowey | |
| 7,708,204 | B2 | 5/2010 | Hamar | |
| 7,777,615 | B2 * | 8/2010 | Okuda | B60D 1/36 280/477 |
| 7,845,504 | B2 * | 12/2010 | Davenport | B61G 7/14 213/1.3 |
| 7,867,310 | B2 | 1/2011 | Baten | |
| 8,185,264 | B2 * | 5/2012 | Carroll | B61L 15/0027 246/167 D |
| 8,191,915 | B2 * | 6/2012 | Freese, V | B60D 1/36 180/167 |
| 8,840,364 | B2 | 9/2014 | Warton et al. | |
| 8,888,121 | B2 * | 11/2014 | Trevino | B60D 1/36 280/477 |
| 9,048,948 | B2 * | 6/2015 | Paral | B61L 15/0036 |
| 2003/0234512 | A1 * | 12/2003 | Holub | B60D 1/36 280/432 |
| 2005/0103017 | A1 | 5/2005 | Kuroki et al. | |
| 2007/0216136 | A1 * | 9/2007 | Dietz | B60D 1/36 280/477 |
| 2011/0036098 | A1 | 2/2011 | Baten | |
| 2011/0216199 | A1 * | 9/2011 | Trevino | B60D 1/36 348/148 |
| 2013/0005237 | A1 | 1/2013 | Baten et al. | |
| 2013/0047908 | A1 | 2/2013 | Baten et al. | |
| 2013/0174761 | A1 | 7/2013 | Warton et al. | |

OTHER PUBLICATIONS

PCT Search Report and Written Opinion issued in connection with Corresponding Application No. PCT/US2015/048421 dated Mar. 17, 2016.

* cited by examiner

SYSTEMS AND METHODS FOR A TURBINE TRAILER MECHANICAL DOCKING AND ALIGNMENT SYSTEM

BACKGROUND

The subject matter disclosed herein relates to gas turbine systems, and more particularly to systems and methods for aligning mobile turbomachinery, such as various sections of a mobile turbine system.

Gas turbines are used in many land and marine based applications. For example, a gas turbine may be coupled to a generator to generate power for an electrical power grid. The process of coupling the gas turbine to the generator may utilize various alignment techniques that may take as long as a few hours to a few days, depending on external conditions. This downtime of the gas driven generator may result in lost revenues, brown outs, or black outs. Accordingly, it may be beneficial to provide systems and methods for faster alignment techniques and higher alignment repeatability (e.g., reliability) between gas turbines and generators.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a docking guide comprising a first alignment guide configured to couple with a first mobile unit that supports a turbine engine and a second alignment guide configured to couple with a second mobile unit that supports a generator. The first and second alignment guides are configured to guide a coupling between the first and second mobile units to help align the turbine engine with the generator.

In a second embodiment, an apparatus includes an alignment system configured to help align a coupling between a first mobile unit that supports a turbine engine and a second mobile unit that supports a generator. The alignment system comprises a laser configured to emit a beam of light to a target and a camera configured to capture a visual of the target.

In a third embodiment, a system includes a first mobile unit supporting a turbine engine, a second mobile unit supporting a generator, and a docking guide. The docking guide comprising a first alignment guide coupled with the first mobile unit and a second alignment guide coupled with the second mobile unit. The first and second alignment guides are configured to guide a coupling between the first and second mobile units to help align the turbine engine with the generator. The alignment system is configured to help align the coupling between the first mobile unit and the second mobile unit. The alignment system also comprises a laser configured to emit a beam of light to a target and a camera configured to capture a visual of the target.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
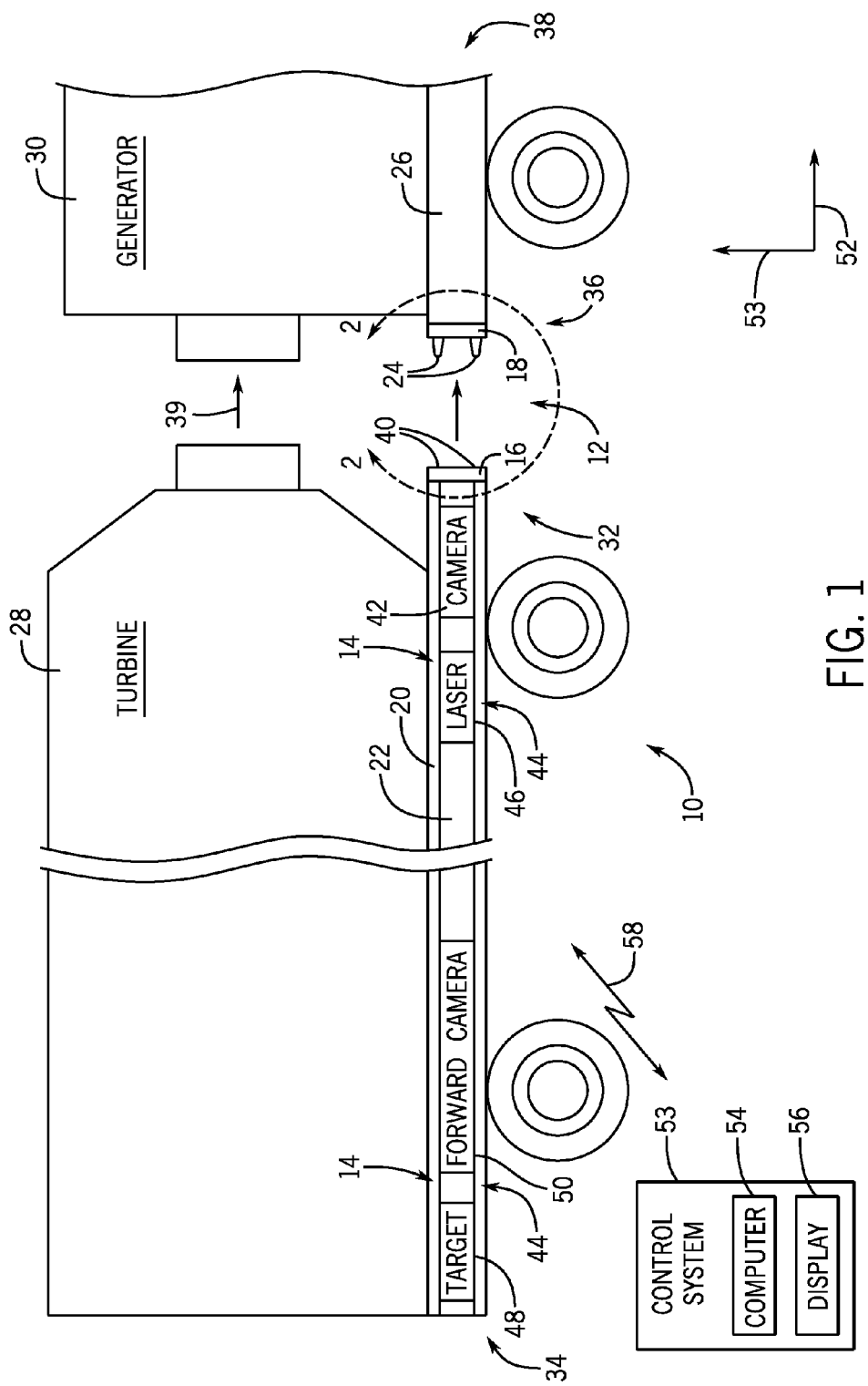
FIG. 1 is a schematic of an embodiment of a turbine system illustrating a mechanical docking system and a mechanical alignment system, where the mechanical docking system is coupled to a turbine trailer and a generator trailer, and where the alignment system is disposed within a turbine trailer spine of the turbine trailer.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to systems for a mechanical alignment system and a mechanical docking system configured to align a gas turbine trailer with a generator trailer, as well as align a gas turbine with a generator. Without the disclosed embodiments, alignment techniques utilized in the field to align the gas turbine with the generator may take up to a few hours or a few days depending on various environmental factors. For example, in some situations, a mobile gas turbine generator system may be transported to a location in need of electricity, such as during an emergency natural disaster, or other event resulting in insufficient electricity. In such situations, the alignment system and the docking system may be configured to align the turbine to the generator while eliminating the need to field align the turbine trailer to the generator trailer. Accordingly, the time saved with the disclosed embodiments enables faster installation and commissioning, thereby helping to reduce downtime of system components and revenue lost. In addition, the ability to quickly swap trailers in the field with high alignment repeatability improves unit fleet flexibility (e.g., improves the flexibility of the fleet of available turbine trailers), allowing for easier management of scheduling, availability, conflicts, and so forth.

In certain embodiments, the mechanical docking system may be utilized in an initial pre-alignment phase (e.g., installation phase) and a commissioning phase on the field. During the commissioning phase, the mechanical docking system (e.g., docking station) may include a turbine docking plate coupled to the turbine trailer and a generator docking plate coupled to the generator trailer. Specifically, the turbine docking plate may be coupled to a turbine trailer spine of a turbine trailer via one or more mounting side plates. Further, the generator docking plate may be coupled to the generator trailer, such that one or more docking pins (e.g., dowel pins) on the generator docking plate engage with one or more registers on the turbine docking plate as the turbine trailer is backed into position relative to the generator trailer. Accordingly, during a commissioning phase, once the turbine docking plate engages with the generator docking plate, the turbine trailer may be effectively aligned with the generator trailer, thereby aligning the turbine with the generator.

In some embodiments, the docking system may include a static alignment reference frame configured to provide a reference point for the alignment of the turbine trailer and the generator trailer, and thereby the turbine and the generator, during the initial pre-alignment phase (e.g., installation phase). For example, the static alignment frame may be used to initially assemble and align the turbine trailer and the generator trailer during pre-alignment of the trailers, using a first round plate (e.g., turbine round plate) and a second round plate (e.g., generator round plate) to mimic the turbine flange and the generator flange, respectively. Accordingly, the mechanical docking system may be utilized for subsequent aligning of the turbine and the generator via the turbine trailer and the generator trailer during a commissioning phase. The subsequent aligning may be done with high reliable alignment repeatability, increasing the flexibility of trailer systems and reducing the amount of downtime between alignment schedules.

The mechanical alignment system may be disposed within the turbine trailer spine and may be configured to analyze and/or determine the alignment status of the turbine trailer during the commissioning and/or installation phases. The mechanical alignment system may include an internal spine laser system and a rear camera. In certain embodiments, the rear camera may be configured to provide a visual of the docking system (e.g., docking station) and may be communicatively coupled (e.g., wired and/or wireless) to a computer suitable for executing and/or monitoring a variety of field device configuration and monitoring applications. The internal spine laser system may include one or more cameras (e.g., forward target camera), at least one laser and laser mount, one or more access ports, and one or more targets for the laser, as further described in detail with respect to FIG. 7. In some embodiments, the internal spine laser system may be configured to analyze and/or determine whether the length of the turbine trailer is aligned with the generator trailer (e.g., alignment of axes) and may also be communicatively coupled to the computer.

Turning now to the drawings, FIG. 1 is a block diagram of an embodiment of a turbine system 10 illustrating a mechanical docking system 12 and an alignment system 14. The mechanical docking system 12 includes a turbine docking plate 16 and a generator docking plate 18. The turbine docking plate 16 may be coupled to a turbine trailer 20, and more specifically, may be coupled to a turbine trailer spine 22 running the length of the turbine trailer 20 (e.g., along a central longitudinal axis). Likewise, the mechanical docking plate 18, having one or more docking pins 24 (e.g., dowel pins 24), may be coupled to a generator trailer 26. The trailers 20, 26 may be configured to transport turbomachinery (e.g., one or more sections of the turbine system 10) from one location to another, such as, for example, from an installation site to a commissioning site, a commissioning site to a remote location, and so forth. For example, in the illustrated embodiment, the turbine trailer 20 may be configured to move a turbine 28 (e.g., a gas turbine engine, a steam turbine, a hydroturbine, a wind turbine, or any turbine system) into alignment with the generator 30 before the turbine 28 is coupled to the generator 30. Likewise, the generator trailer 20 may be configured to move a generator 30 into a position where it may be aligned with the turbine 28.

As noted above, in some situations, such as during an emergency situation in which a location is in need of electricity, the turbine trailer 20 and the generator trailer 26 may be utilized to move and couple the turbine 28 and the generator 30 onto the field for removal, coupling, and/or recoupling. For example, prior to coupling, the generator trailer 26 supporting the generator 30 may be moved into a first position. In certain embodiments, the turbine trailer 20 supporting the turbine 28 may move in a reverse direction 39 into the generator trailer 26, such that a tail end 32 of the turbine trailer 20 (e.g., relative to a head end 34 of the turbine trailer 20) is moved towards a tail end 36 of the generator trailer 26 (e.g., relative to a head end 38 of the generator trailer 26). In such embodiments, the generator trailer 26 may remain stationary in the first position while the turbine trailer 20 is moved in the reverse direction 39 into the first position so that the turbine 28 may be coupled to the generator 30. While the illustrated embodiments describe the turbine trailer 20 moving in the reverse direction 39 as the generator trailer 26 is stationary, it should be noted that in other embodiments, the generator trailer 26 may move towards the stationary turbine trailer 20 and/or both trailers 20, 26 may move towards one another during the docking process.

In some embodiments, the mechanical docking system 12 may be utilized to help properly align the turbine 28 with the generator 30 as the turbine trailer 20 is aligned with the generator trailer 26, such as during the docking process. For example, the mechanical docking system 12 may include the turbine docking plate 16 and the generator docking plate 18, where the turbine docking plate 16 may be coupled to the tail end 32 of the turbine trailer 20 and the generator docking plate 18 may be coupled to the tail end 36 of the generator trailer 26. Specifically, in certain embodiments, the turbine docking plate 16 may be coupled to the turbine trailer spine 22, which may run the entire length of the turbine trailer 20 (e.g., along a central longitudinal axis). Accordingly, the turbine docking plate 16 and the generator docking plate 18 may be disposed along the tail ends 32, 36 of the trailers 20, 26, such that they are disposed along the rear bumper ends of the trailers 20, 26. In certain embodiments, the generator docking plate 18 may include one or more docking guides, such as docking pins 24 (e.g., 1, 2, 3, 4, 5, 6, 7, 8, 9, 10 or more), which are configured as male coupling pieces. The one or more docking pins 24 may couple with one or more docking guides, such as openings 40 (e.g., 1, 2, 3, 4, 5, 6, 7, 8, 9, 10 or more) on the turbine docking plate 16, configured as female coupling pieces, as further described with respect to FIGS. 2-5. In the illustrated embodiment, two docking pins 24 are disposed on the generator docking plate 18 and are configured to couple with two openings 40 disposed on the turbine docking plate 16. Accordingly, as the tail end 32 of the turbine trailer 20 is reversed into the generator trailer 26, the docking pins 24 on the generator docking plate 18 may gradually couple with the openings 40 on the turbine docking plate 16. Once the docking plates 16, 18 are coupled, a variety of fastening hardware may be used to secure the trailers 20, 26 together. As such, once the docking pins 24 on the generator docking plate 18 engage with the openings 40 on the turbine docking plate 16, the turbine trailer 20 and the generator trailer 26 are effectively aligned, without the need for extensive field-alignment techniques.

In some embodiments, the mechanical alignment system 14 may be also be utilized to help properly align the turbine 28 with the generator 30 as the turbine 28 is coupled to the generator 30, such as during the docking process. For example, the alignment system 14 may include one or more rear cameras 42 configured to provide a visual of the docking system 12, such as a visual of the docking process between the generator docking plate 18 and the turbine docking plate 16. Further, the mechanical alignment system 14 may include an internal spine laser system 44 comprising one or more lasers 46 directed towards one or more targets 48, and one or more front cameras 50 configured to provide a visual of the target 48. In certain embodiments, the internal spine laser system 44 may be configured to determine and/or analyze whether the length of the turbine trailer spine 22, and thereby the turbine trailer 20 and the turbine 28, are approximately straight along a longitudinal direction or axis 52 of the system 10. Indeed, it may be beneficial to ensure that the length of the turbine trailer spine 22 is approximately straight to help ensure the proper coupling of the turbine 28 with the generator 30. Accordingly, one or more lasers 46 disposed within the turbine trailer spine 22 proximate to the tail end 32 of the turbine trailer 20 may be directed at the one or more targets 48 disposed within the turbine trailer spine 22 proximate to the head end 34 of the turbine trailer 20. The laser 46 may be configured to provide a uniform beam of light 101 towards the target 48 in approximately the axial direction 54. Further, the forward camera 50 may be directed to provide a visual of the target 48, so that a user and/or operator are able to visualize the resulting beam of light 101 on the target 48, as further explained in detail with respect to FIGS. 2, 3, 8, and 9.

In certain embodiments, the alignment system 14 may be communicatively coupled to a control system 53, such as a computer 54. For example, the rear camera 42 and/or the forward camera 50 may be coupled to the computer 54. The control system 53 and/or the computer 54 may include a microprocessor and a memory, where the memory may include any suitable non-transitory, tangible, computer-readable medium having executable instructions. The computer 54 may be suitable for executing a variety of field device configuration and monitoring applications, and for providing an operator interface through which an engineer or technician may monitor the components of the system 10. The computer 54 may be any type of computing device suitable for running software applications, such as a laptop, a workstation, a tablet computer, or a handheld portable device (e.g., personal digital assistant or cell phone). Indeed, the computer 54 may include any of a variety of hardware and/or operating system platforms. In some embodiments, the computer may host industrial control software, such as a human-machine interface (HMI) software, a manufacturing execution system (MES), a distributed control system (DCS), a supervisor control and data acquisition (SCADA) system, and so forth. For example, the visual provided by the rear camera 42 and/or the forward camera 50 may be displayed on a display 56 within the control system 53. In some embodiments, the computer 54 may be communicatively coupled via wired and/or wireless conduits 58 to components of the alignment system 14, such as the rear camera 42 and/or the forward camera 50. The wireless conduits 58 may include WiFi (e.g., Institute of Electrical and Electronics Engineers [IEEE] 802.11X, cellular conduits (e.g., high speed packet access [HSPA], HSPA+, long term evolution [LTE], WiMax), near field communications (NFC), Bluetooth, personal area networks (PANs), and the like. The wireless conduits 58 may use a variety of communication protocols, such as TCP/IP, UDP, SCTP, socket layers, and so on. The wired conduits 58 may include proprietary cabling, RJ45 cabling, co-axial cables, fiber optic cables, and so on. In certain embodiments, the control system 53 and the wireless and/or wired conduits 58 may communicate data with secure layers, such as secure socket layers (SSL), virtual private network (VPN) layers, encrypted layers, challenge key authentication layers, token authentication layers, and so on.

Figure 2:
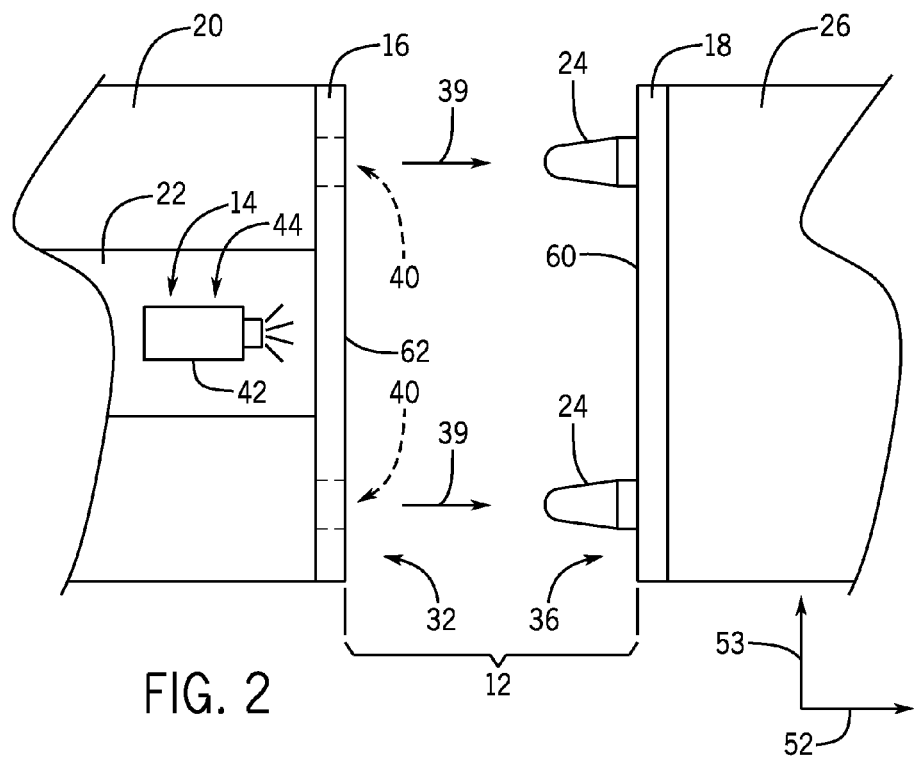
FIG. 2 is a schematic of an embodiment of the mechanical docking system of FIG. 1, where the mechanical docking system includes a turbine docking plate coupled to the turbine trailer of FIG. 1 moving in a reverse direction towards a generator docking plate coupled to the generator trailer of FIG. 1.

FIG. 2 is a schematic of an embodiment of the mechanical docking system 12 of FIG. 1, where the mechanical docking system 12 includes the turbine docking plate 16 coupled to the turbine trailer 20 and moving towards the generator docking plate 18 coupled to the generator trailer 26. As noted above with respect to FIG. 1, the turbine trailer 20 may be configured to move in a reverse direction 39, such that the tail end 32 of the turbine trailer 20 moves towards the tail end 36 of the stationary generator trailer 26. In this manner, the docking system 12 may be configured to help align the turbine 28 with the generator 30 during and after the docking process. Specifically, the docking system 12 may include the generator docking plate 18 having one or more docking guides such as docking pins 24, and the turbine docking plate 16 having one or more docking guides such as openings 40. As the turbine trailer 20 moves in the reverse direction 39 towards the generator trailer 26, the one or more docking pins 24 on the generator docking plate 18 may be utilized as guide pieces (e.g., coupling pieces) configured to guide one or more openings 40 on the turbine docking plate 16. In particular, the guide pieces may help guide the engagement and may ensure proper alignment of the docking plates 16, 18. In some embodiments, it should be noted that the guide pieces (e.g., the one or more docking pins 24)

may be disposed on the generator docking plate 18, while the one or more openings 40 are disposed on the turbine docking plate 16.

In certain embodiments, the rear camera 42 of the alignment system 14 may be configured to provide a visual of the docking system 12 to the control system 53 as the turbine trailer 20 is moved in the reverse direction 39 towards the generator trailer 26 (e.g., during the docking process). In such embodiments, the visual of the docking system 12 may be utilized by an operator and/or engineer to adjust the progression of the turbine trailer 20 in the reverse direction 39. For example, in some situations, the turbine trailer 20 may be moving in the reverse direction 39 such that the docking pins 24 are not in alignment along the longitudinal axis 52 with the one or more openings 40. In such situations, the progression of the turbine trailer 20 may be adjusted or altered such that the docking pins 24 are in alignment along the longitudinal axis 52 and are configured to couple with the openings 40. Accordingly, the docking pin 24 may be configured and/or utilized as reference points and/or registers during the process of coupling the turbine trailer 20 with the generator trailer 26, and thus coupling the turbine 28 with the generator 30. Indeed, the docking pins 24 and the openings may be configured to act as guides or alignment structures, which ensure proper alignment between the turbine 28 and the generator 30.

Figure 3:
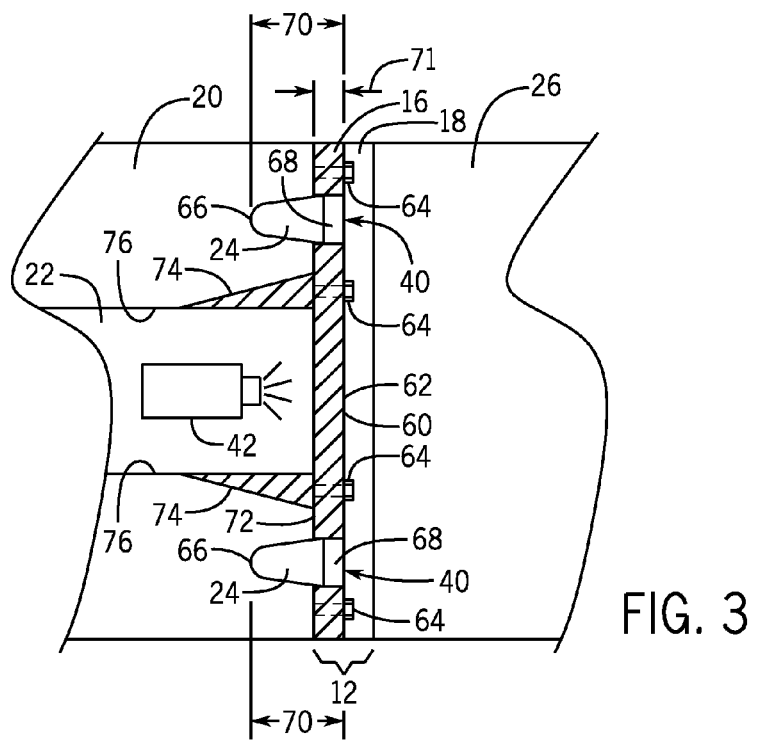
FIG. 3 is a schematic of an embodiment of the mechanical docking system of FIG. 1, where the mechanical docking system includes a turbine docking plate of FIG. 2 coupled to the generator docking plate of FIG. 2.

FIG. 3 is a schematic of an embodiment of the mechanical docking system 12 of FIG. 1, where the mechanical docking system 12 includes the turbine docking plate 16 coupled to the generator docking plate 18 via one or more pairs of mated docking guides, such as docking pins 24 (e.g., dowel pins 24) disposed in openings 40. In the illustrated embodiment of the coupled docking system 12, a front surface 60 of the generator docking plate 18 may be substantially parallel along a vertical axis 55 to a front surface 62 of the turbine docking plate 16. Further, the front faces 60, 62 of the docking plates 16, 18 may be substantially complementary and/or paired, such that a distance between the docking plates 16, 18 is at a minimum when the trailers 20, 26 are coupled. In certain embodiments, after the trailers 20, 26 are coupled (e.g., the docking pins 24 are securely within the openings 40), fastening hardware 64 (e.g., nuts, bolts, screws, latches, fasteners, etc.) may be utilized to secure the plates 16, 18 in the coupled position.

In certain embodiments, the docking pins 24 and openings 40 may be configured to help the turbine trailer 20 center itself relative to the generator trailer 26 during the docking process. For example, the shape of docking pins 24 may be tapered or conical, such that the turbine trailer 20 moving in the reverse direction 39 has a greater position tolerance as it moves from a tip 66 of the docking pin 24 to a base 68. Accordingly, the tapered edges of the docking pins 24 may help with gradual insertion into the openings during alignment. Further, a length 70 of the docking pins 24 may extend further than a back surface 72 of the turbine docking plate 16 to ensure that the docking pins 24 are securely coupling the plates 16, 18. In other embodiments, the docking pins 24 may be any shape (e.g., cylindrical, rectangular, tapered cone, etc.), and the length 66 may extend past the back surface 72 of the turbine docking plate 16. In certain embodiments, the base portion 68 of the conical docking pins 24 may be a cylindrical base that extends past the back surface 72 of the turbine docking plate 16.

In certain embodiments, the turbine docking plate 16 may include one or more mounting wings (illustrated in FIG. 5) and one or more mounting side plates 74 configured to provide support and structural integrity to the turbine docking plate 16. Specifically, the mounting side plates 74 may be configured to secure the turbine docking plate 16 to the turbine trailer spine 22. The mounting side plates 74 may be secured to one or more sidewalls 76 of the turbine trailer spine 22 via one or more removable fastening hardware 64 (e.g., nuts, bolts, screws, latches, fasteners, etc.) and/or the mounting side plates 74 may be fixed to the sidewall 76 via welded joints.

Figure 4:
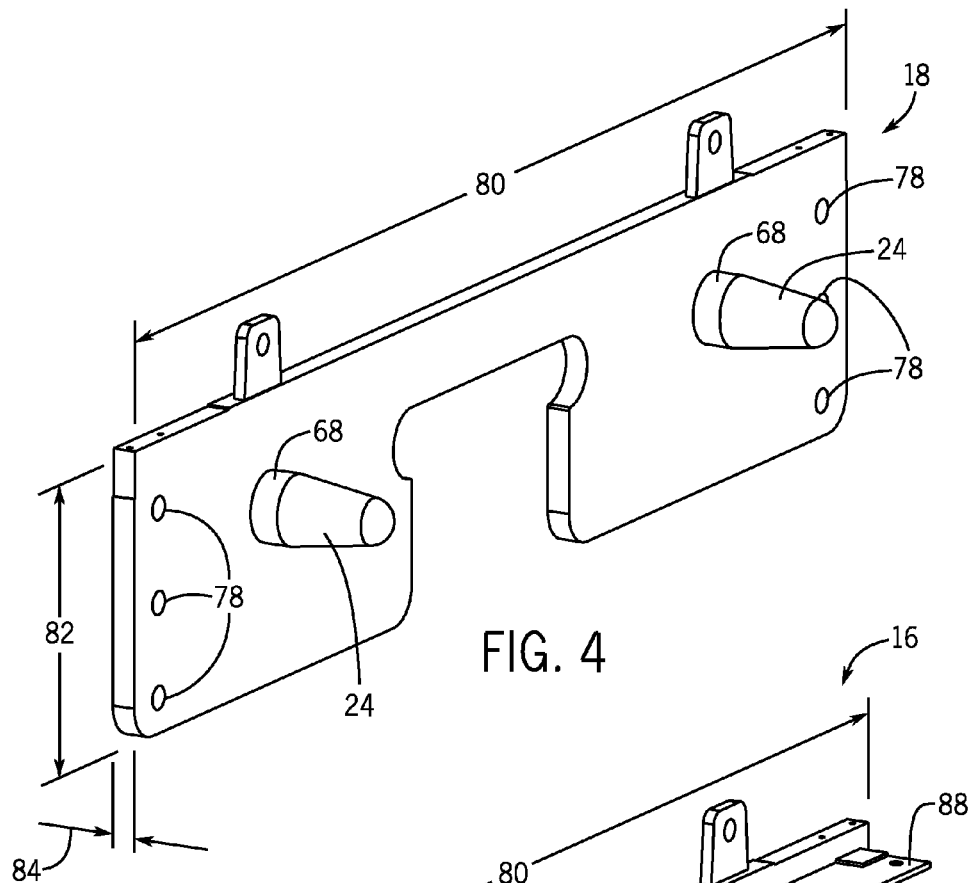
FIG. 4 is a perspective view of an embodiment of the generator docking plate of FIG. 1, illustrating two docking pins.

FIG. 4 is a perspective view of an embodiment of the generator docking plate 18 of FIG. 1, illustrating two docking pins 24 and a plurality of holes 78 configured to receive the fastening hardware 64. For example, once the plates 16, 18 are coupled to one another in alignment (e.g., the docking pins 24 are securely within the openings 40 in the turbine docking plate 16), the one or more pieces of fastening hardware 64 (e.g., bolts) may be inserted through the holes 78 to secure the plates 16, 18 together.

In certain embodiments, a length 80 of the generator docking plate 18 may be approximately 120 cm to 150 cm, 150 cm to 180 cm, or 180 cm to 200 cm. Further, a height 82 of the generator docking plate 18 may be approximately 45 cm to 50 cm, 50 cm to 60 cm, or 60 cm to 75 cm, and a width 84 of the generator docking plate 18 may be approximately 1 cm to 3 cm, 3 cm to 5 cm, or 5 cm to 8 cm. In addition, the base portion 68 of the docking pins 24 may be a straight cylindrical portion with a diameter of approximately 1 cm to 3 cm, 3 cm to 5 cm, or 5 cm to 8 cm. In some embodiments, the base portion 68 of the docking pins 24 may extend past the width 84 of the turbine docking plate 16, and may be configured to ensure that the plates 16, 18 are properly and fully coupled to one another.

Figure 5:
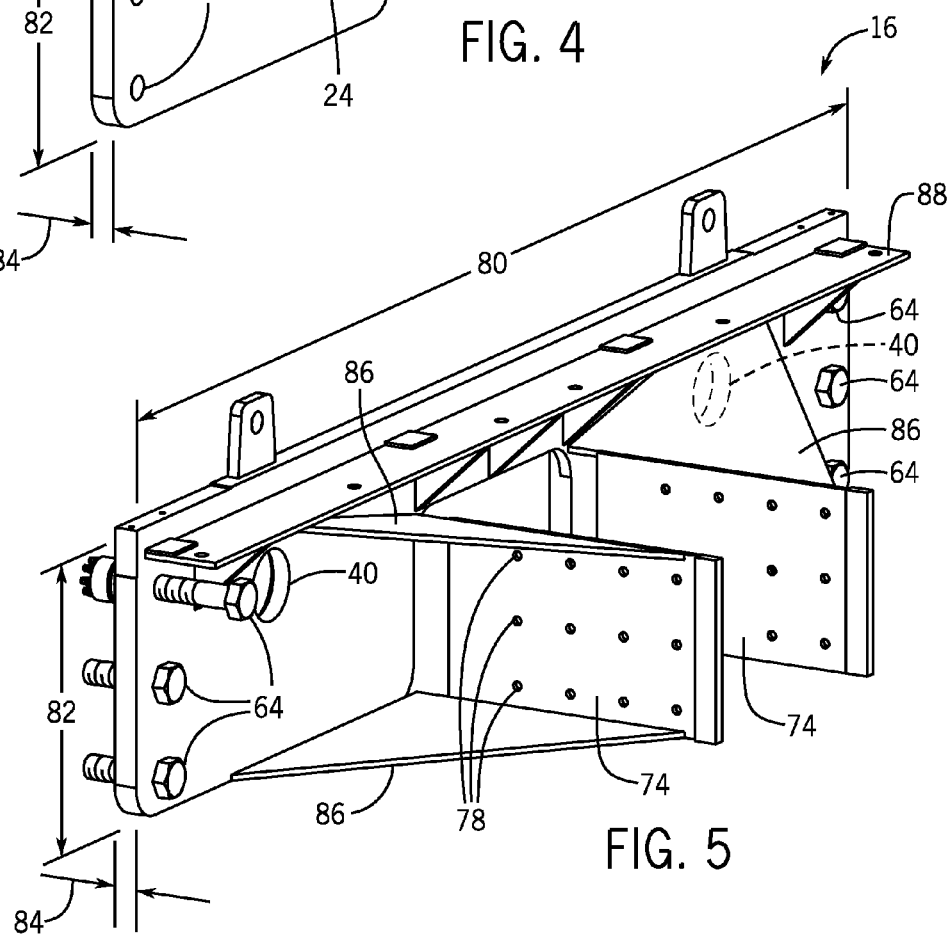
FIG. 5 is an perspective view of an embodiment of the turbine docking plate of FIG. 1, illustrating four mounting wings and two mounting side plates.

FIG. 5 is a perspective view of an embodiment of the turbine docking plate 16 of FIG. 1, illustrating two openings 40 for the docking pins 24, the side plates 74, and the mounting wings 86. As noted above, as the tail end 32 of the turbine trailer 20 is reversed into the generator trailer 26, the docking pins 24 on the generator docking plate 18 may gradually couple with the openings 40 on the turbine docking plate 16. Once the docking plates 16, 18 are coupled, a variety of fastening hardware may be used to secure the docking plates 16, 18 together. For example, one or more fastening hardware 64 (e.g., nuts, bolts, screws, latches, fasteners, etc.) may be utilized to secure the turbine docking plate 16 to the generator docking plate 18, as further described with respect to FIG. 6.

In certain embodiments, the mounting side plates 74 may be secured to one or more sidewalls 76 of the turbine trailer spine 22 via one or more fastening hardware 64 (e.g., nuts, bolts, screws, latches, fasteners, etc.). In the illustrated embodiment, a plurality of holes 78 may be disposed on the mounting side plates 74, and may be utilized by the fastening hardware 64 (e.g., bolts) to secure the mounting side plates 74 to the one or more sidewalls 76 (FIG. 3) of the turbine trailer spine 22. In other embodiments, the mounting side plates 74 may be welded to the one or more sidewalls 76. Further, in some embodiments, the mounting side plates 74 may be welded and/or coupled via fastening hardware 64 (e.g., bolts) to the mounting wings 86, and may be configured to provide support and structural integrity to the plates 16, 18. In certain embodiments, the mounting wings 86 and the side plates 74 may be welded together. In some embodiments, any number of additional alignment plates 88 may be coupled to the docking plates 16, 18, such as the register alignment plates 88 configured to help align the docking station 12 to the trailers 20, 26. For example, the register alignment plates 88 disposed on the turbine docking plate 16 may be configured to align the length of the turbine docking plate 16 to the turbine trailer 20.

In certain embodiments, the length 80 of the turbine docking plate 16 may be approximately 120 cm to 150 cm, 150 cm to 180 cm, or 180 cm to 200 cm. Further, a height 82 of the turbine docking plate 16 may be approximately 45 cm to 50 cm, 50 cm to 60 cm, or 60 cm to 75 cm, and a width 84 of the generator docking plate 18 may be approximately 1 cm to 3 cm, 3 cm to 5 cm, or 5 cm to 8 cm.

Figure 6:
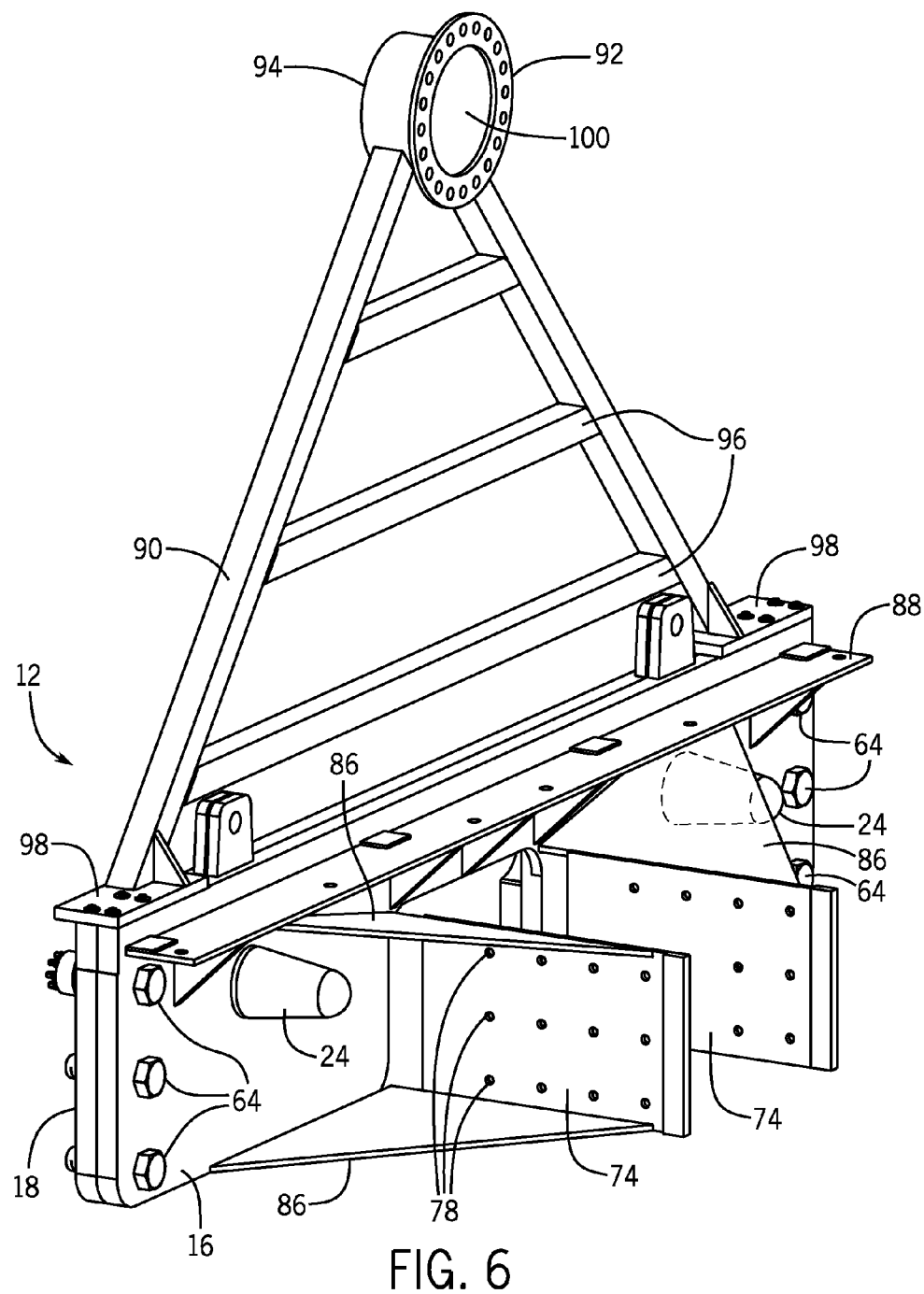
FIG. 6 is a perspective view of an embodiment of the mechanical docking system of FIG. 1, further illustrating an alignment reference frame.

FIG. 6 is a perspective view of an embodiment of the mechanical docking system 12 of FIG. 1, further illustrating an alignment reference frame 90. In certain embodiments, the docking system 12 may include the alignment frame 90, which may be configured to provide a reference point for the alignment of the turbine trailer 20 and the generator trailer 26 during assembly of the turbine 28 and the generator 30, such as during an installation phase. For example, the alignment frame 90 may be used to initially align (e.g., pre-alignment) the turbine trailer 20 and the generator trailer 26 during an initial assembly (e.g., installation phase), such as during initial assembly during a manufacturing phase. The alignment frame 90 may include a first round plate 92 (e.g., turbine round plate 92) and a second round plate 94 (e.g., generator round plate 94) configured to mimic the turbine flange (e.g., portion of the turbine 28 configured to couple with the generator 30 and the generator flange (e.g., portion of the generator 30 configured to couple with the turbine 28), respectively. For example, the alignment frame 90 may help to align the turbine 28 and the generator 30 along a rotational axis reference in a common orientation and/or position on their respective trailers 20, 26. Accordingly, subsequent alignments of the turbine 28 and the generator 30 via the turbine trailer 20 and the generator trailer 26, such as due to maintenance, repair, recoupling or swapping of the turbine 28 and/or the generator 30 (e.g., commissioning phase), may be done with high reliable alignment repeatability. For example, utilizing the alignment frame 90 during an initial installation phase may allow a first turbine trailer 20 to be swapped with a second turbine trailer 20 at a later time (e.g., during the commissioning phase), so long as the same alignment frame 90 was used during the initial installation phase of the second turbine trailer 20 as the first turbine trailer 20. As such, utilizing the alignment frame 90 during an installation phase to pre-align the trailers 20, 26 may help eliminate the need to align the trailers 20, 26 on the field during a commissioning phase, thereby helping to reduce the field alignment time of the turbine 28 and the generator 30 disposed their respective trailers 20, 26. In this manner, in certain embodiments, the alignment frame 90 of the docking system 12 may be configured as a reference point for the initial installation of the trailers 20, 26, and may help increase the swap flexibility of the turbine trailers 20 in a fleet during a commissioning phase and reduce downtime of system 10 components.

In certain embodiments, the alignment frame 90 may be in an "A" shaped frame configuration, with one or more support rods 96 coupled at a base 98 to the docking plates 16, 18 (e.g., turbine docking plate 16 and the generator docking plate 18). It should be noted that in other embodiments, the alignment frame 90 may be in other frame configurations, such as a frame configurations in other geometric configurations (e.g., triangular, rectangular, circular, etc.) Further, the one or more support rods 96 may be coupled to the first round plate 92 (e.g., turbine round plate 92) and a second round plate 94 (e.g., generator round plate 94). The turbine round plate 92 may be configured to mimic the turbine flange (e.g., portion of the turbine 28 configured to couple with the generator 30) and the generator round plate 94 may be configured to mimic the generator flange (e.g., portion of the generator 30 configured to couple with the turbine 28). In particular, the alignment frame 90 may be configured to provide a fixed reference point 100 for the turbine 28 and the generator 30 and the trailers 20, 26 may be aligned while the turbine 28 is aligned with the generator 30. For example, the turbine round plate 92 may be configured as the reference point 100 for the turbine flange, while the generator round plate 94 may be configured as the reference point 100 for the generator flange. In certain embodiments, the alignment frame 90 may help align the turbine 28 and the generator 30 along a rotational reference axis such that the turbine 28 and the generator 30 are in a common orientation relative to the docking station 12. In certain embodiments, various alignment techniques may be utilized with the alignment frame 90 to align the turbine 28 with the generator 30. For example, alignment techniques such as dial indicators, laser systems, and so forth.

Figure 7:
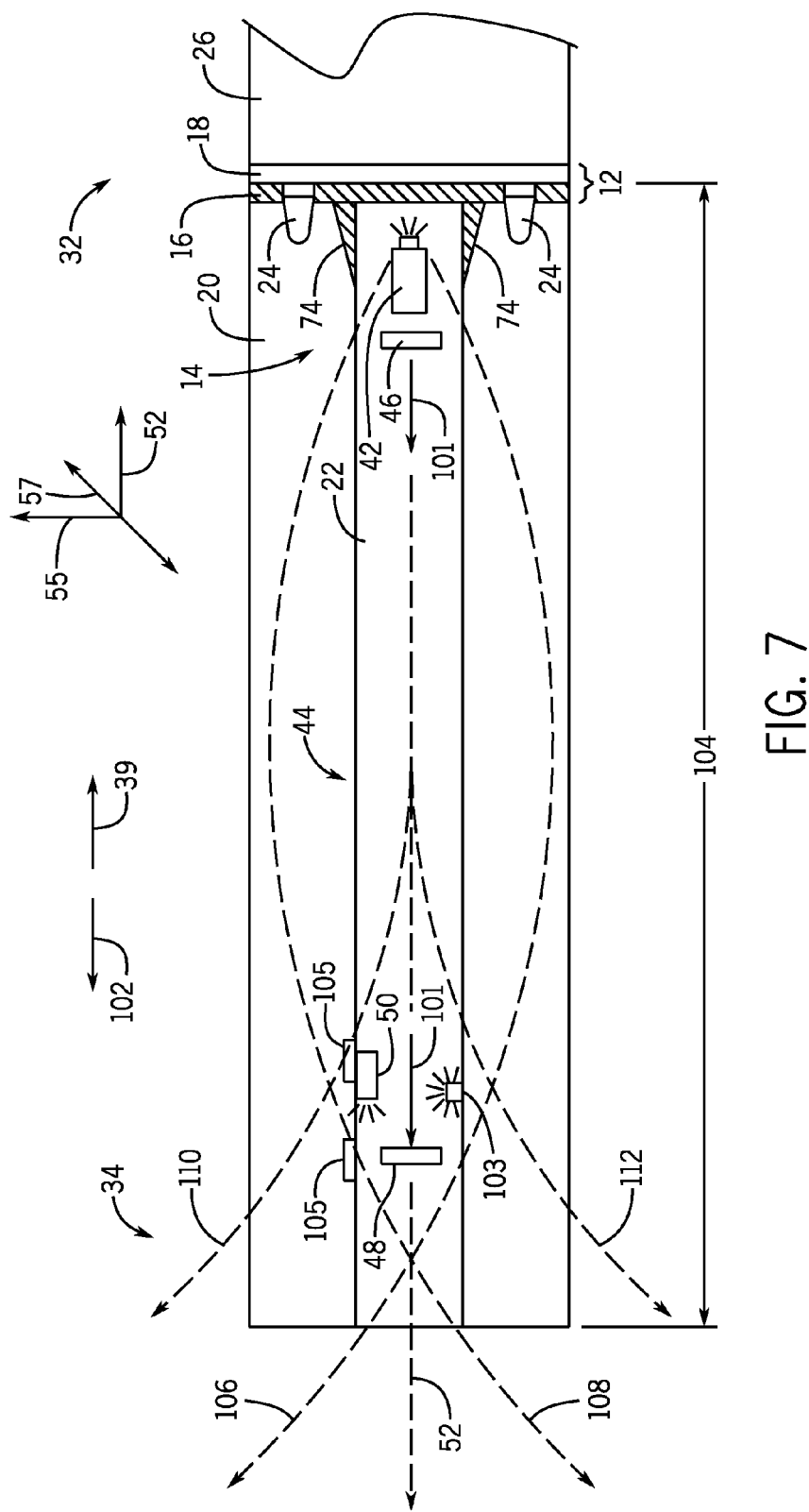
FIG. 7 is a schematic of an embodiment of the alignment system of FIG. 1, illustrating a rear camera and an internal spine laser system, where the internal spine laser system comprises a forward camera, a laser system, and a target.

FIG. 7 is a schematic of an embodiment of the alignment system 14 of FIG. 1, where the alignment system 14 comprises the rear camera 42 and the internal spine laser system 44. As noted above with respect to FIG. 1, the rear camera 42 may be configured to provide a visual of the docking system 12 (e.g., the turbine docking plate 16 and the generator docking plate 18) to the computer 54 during the docking process. In some embodiments, the internal spine laser system 44 includes one or more light sources 46 (e.g., lasers 46), one or more forward cameras 50, and one or more targets 48. The laser 46 of the internal spine laser system 44 may be directed towards the target 48 in a forward direction 102, and the forward camera 50 may be configured to provide a visual of the target 48 to the computer 54. Accordingly, in some embodiments, the alignment system 14 may be configured to help analyze and/or determine the alignment status of the turbine 28 with the generator 30 during the docking process. For example, the rear camera 42 may be utilized to analyze and/or determine whether the docking process, such as the progression of the turbine docking plate 16 in the reverse direction 39 towards the generator docking plate 18, is in alignment. Further, the internal spine laser system 44 may be configured to determine and/or analyze whether a turbine trailer length 104 of the turbine trailer 20 (e.g., approximately 9 meters to 13 meters, 13 meters to 15 meters, 15 meters or more), is approximately straight along a longitudinal direction 52 (e.g., a longitudinal axis). Indeed, it may be beneficial to ensure that the length 104 of the turbine trailer spine 22 is approximately straight to help ensure the proper coupling of the turbine 28 with the generator 30 during the docking process (e.g., during the installation and/or commissioning phase), such that the rotational axes of the turbine 28 and the generator 30 are lined up with one another.

Accordingly, one or more lasers 46 disposed within the turbine trailer spine 22 proximate to the tail end 32 of the turbine trailer 20 may be directed at the one or more targets 48 disposed within the turbine trailer spine 22 proximate to the head end 34 of the turbine trailer 20. The laser 46 may be configured to provide a uniform beam of light 101 towards the target 48 in approximately the forward direction 102. Further, the forward camera 50 may be directed to provide a visual of the target 48 to the computer 54, so that a user and/or operator are able to visualize the resulting beam of light 101 on the target 48, as further explained in detail with respect to FIG. 8. In some embodiments, the laser 46 may be any form of light source configured to emit a straight beam of light 101 in the forward direction 102 towards the target 48 and approximately along the longitudinal axis 52. The target 48 may be a sheet formed of any material (e.g., aluminum alloy) and may have a surface coating that allows the resulting beam of light 101 to be clearly visible against the surface of the target 48. In addition, in certain embodiments, the internal spine laser system 44 may include one or more light sources 103 (e.g., light emitting diodes (LEDs), or any other source of light) configured to shine light on the target 48, such that the forward camera 50 is able to provide a clear visual of the target 48 to the computer 54. Further, the laser system 44 may include one or more access ports 105, which may be utilized by a computer, an operator and/or user to access the forward camera 50, the target 48, and/or the light sources 103 for maintenance, repair, replacements, etc.

In some embodiments, the location of the beam of light 101 on the target 48 may be indicative of the alignment status of the turbine trailer 20 and the turbine trailer spine 22. In particular, the forward camera 50 may be configured to provide a visual of the location of the beam of light 101 on the target 48 to the computer 54, so that an operator and/or user interacting with the computer 54 may visualize the alignment status of the turbine trailer 22. In some situations, the computer, the operator and/or user may utilize the computer 54 receiving the information from the forward camera 50 to adjust the alignment status and/or the movement of the turbine trailer 20 in the reverse direction 39 during the docking process, so that the turbine 29 and the generator 30 are coupled properly. For example, the computer may analyze the information from the cameras to provide recommendations on the alignment status and/or movement of the turbine trailer 20. In some embodiments, the alignment status of the turbine trailer length 104 may be straight along various directions (e.g., straight, angled or vertically bowed up, angled or vertically bowed down, bent horizontally to the right, bent horizontally to the left, etc.). For example, the alignment status of the turbine trailer 20 may be approximately along straight along the longitudinal axis 52. In some situations, the alignment status of the turbine trailer 22 may be approximately angled up or down in the vertical direction 55 in any number of degrees (e.g., 1 degree to 5 degrees, 5 degrees to 10 degrees, 10 degrees, to 15 degrees, 15 degrees to 20 degrees, etc.), such as in an upward vertical bow 106 or a downward vertical bow 108. In some situations, the alignment status of the turbine trailer 22 may be approximately bent in a horizontal direction 57, such as in a right lateral direction 110 or a left lateral direction 112. In situations where the alignment status of the turbine trailer 20 is not approximately along the longitudinal axis 52 (e.g., at an incorrect location on the target 48), the movement of the turbine trailer 20 may be adjusted to properly straighten the turbine trailer spine 22 along the longitudinal axis 52.

Figure 8:
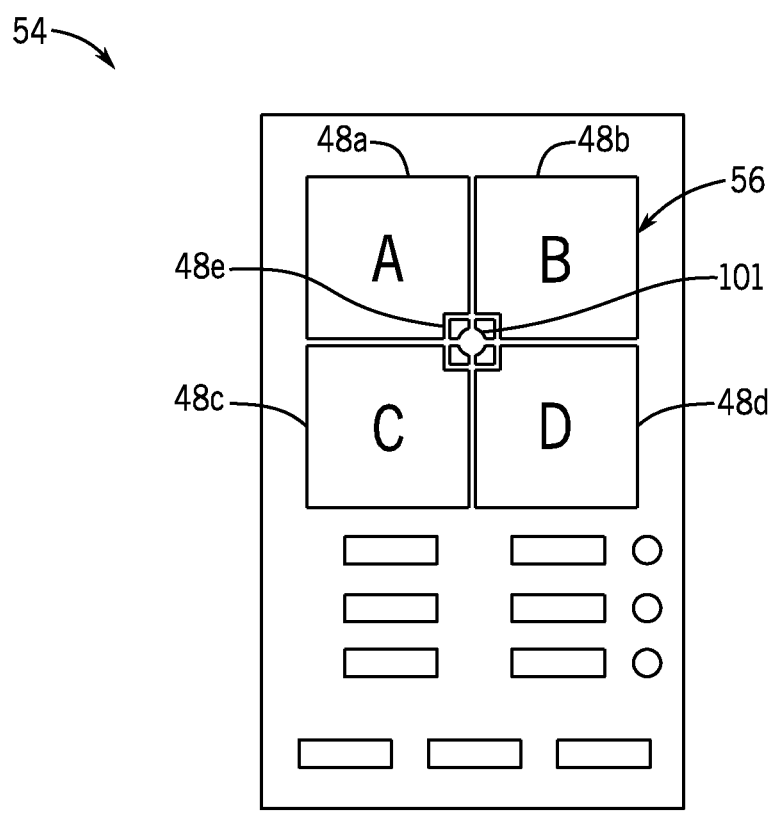
FIG. 8 is a schematic of an embodiment of a computer and a display of FIG. 1, illustrating the visual received from a forward camera disposed within the mechanical alignment system of FIG. 1.

FIG. 8 is a schematic of an embodiment of the computer 54 and the display 56 of FIG. 1, illustrating the visual received from the forward camera 50 of the target 48. As noted above with respect to FIG. 1, the rear camera 42 and/or the forward camera 50 may be coupled to the computer 54. The computer 54 may be any type of computing device suitable for executing software applications, such as a laptop, a workstation, a tablet computer, or a handheld portable device (e.g., personal digital assistant or cell phone). The computer 54 may be suitable for executing a variety of field device configuration and monitoring applications, and for providing an operator interface through which an engineer or technician may monitor the components of the system 10. For example, the engineer or technician may visualize the alignment status of the turbine trailer 20 via the display 56, where the display may depict a visual of the target 48 receiving the beam of light 101 from the laser 46. Further, the movement of the turbine trailer 20 in the reverse direction 39 may be adjusted based on the visualization of the alignment status provided by the cameras 42, 50. While the illustrated embodiment depicts the movement and the alignment of the turbine trailer 20, it should be noted that in other embodiments, the techniques described herein may be utilized to monitor and/or adjust the alignment status of the generator trailer 26 and/or the generator trailer 26 coupled to the turbine trailer 20.

In some embodiments, the target 48 may include one or more regions (e.g., 1, 2, 3, 4, 5, 6, 7, 8, or more) representative of the alignment status of the turbine trailer 20. For example, the target 48 may include a first region 48a, a second region 48b, a third region 48c, a fourth region 48d, and a fifth region 48e indicative of the alignment statues. In some situations, the beam of light 101 emitted from the laser 46 may hit the target 48 in the first region 48a or the second region 48b, which may indicate that the alignment status of the turbine trailer 22 may be approximately bent in a horizontal direction 57, such as in the left lateral direction 112. In some situations, for example, the beam of light 101 emitted from the laser 46 may hit the target 48 in the third region 48c or the fourth region 48d, which may indicate that the alignment status of the turbine trailer 22 may be approximately bent in a horizontal direction 57, such as in the right lateral direction 110. Likewise, in some situations, for example, the location of the beam of light 101 on the target 48 may indicate other alignment statuses, such as the alignment status of the turbine trailer 22 angled up or down in the vertical direction 55 (e.g., the upward vertical bow 106 or the downward vertical bow 108). In particular, the target 48 may include a tolerance box, such as the fifth target region 48e, which may indicate that the turbine trailer 20 is approximately straight along the longitudinal axis 52. For example, in the illustrated embodiment, the beam of light 101 is within the tolerance box, thereby indicating to the engineer or technician viewing the display 56 that the turbine trailer 20 is approximately straight along the longitudinal axis 52.

In some embodiments, the movement of the turbine trailer 20 (e.g., or the movement of the generator trailer 26 and/or the movement of both trailers 20, 26) during the docking process may be adjusted based on the visualization of the alignment status provided by the cameras 42, 50. For example, in some situations, the alignment status of the turbine trailer 20 may be in the upward vertical bow 106 direction or the downward vertical bow 108 direction. In such situations, the turbine trailer 20 may be adjusted vertically by adjusting the tire pneumatics and/or the landing gear of the trailer 20. For example, various transportation components of the trailer 20 may be moved and/or adjusted in the vertical direction 55 to compensate for the misalignment of the trailer 20 in the vertical direction 55 (e.g., upward vertical bow 106 or the downward vertical bow 108) in various degrees. In some situations, the alignment status of the turbine trailer 20 may be in bent in a horizontal direction 57, such as in the right lateral direction 110 or the left lateral direction 112. In such situations, the turbine trailer 20 may be adjusted horizontally by straightening one or more both trailers 20, 26. For example, the turbine trailer 20 may be pulled in the forward direction 102 to straighten the turbine trailer 20 and/or the generator trailer 26 before being moved in the reverse direction 39 to continue the docking process.

Figure 9:
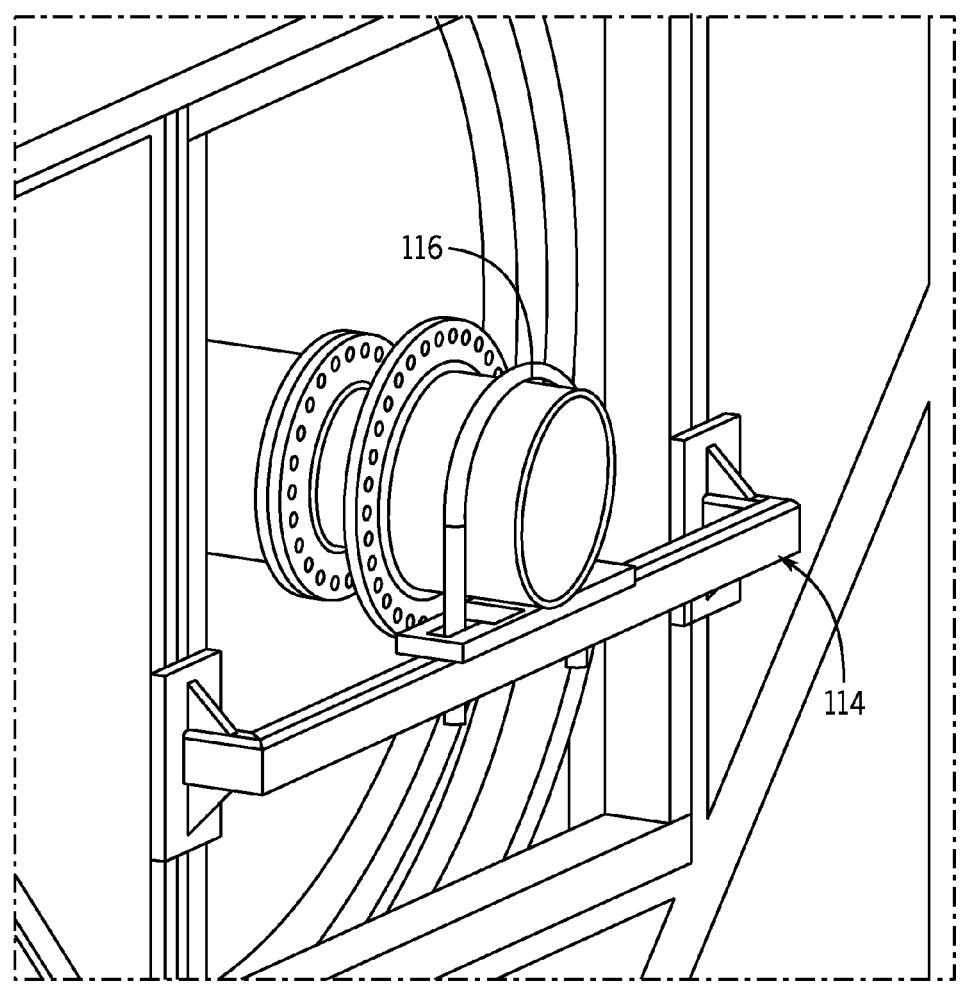
FIG. 9 is a schematic of an embodiment of a shipping tool coupled to the turbine of FIG. 1 and configured to help increase ease of installation of the docking system of FIG. 1.

FIG. 9 is a schematic of an embodiment of a shipping tool 114 coupled to the turbine 28 and configured to help increase ease of installation of the docking system 12. In certain embodiments, the shipping tool 114 may be a coupling cradle 114 comprising a U-bolt 116 coupled to the flange of the turbine 28. The coupling cradle 114 may be configured to secure the turbine 28 during the docking and/or coupling process of the turbine 28 and the generator 30. In some embodiments, the coupling cradle comprises one or more wedges 118 to reduce the movement of the turbine 28 during the coupling and/or docking process. Further, the coupling cradle includes attachment point 28 configured to couple the coupling cradle to the turbine 28.

Figure 10:
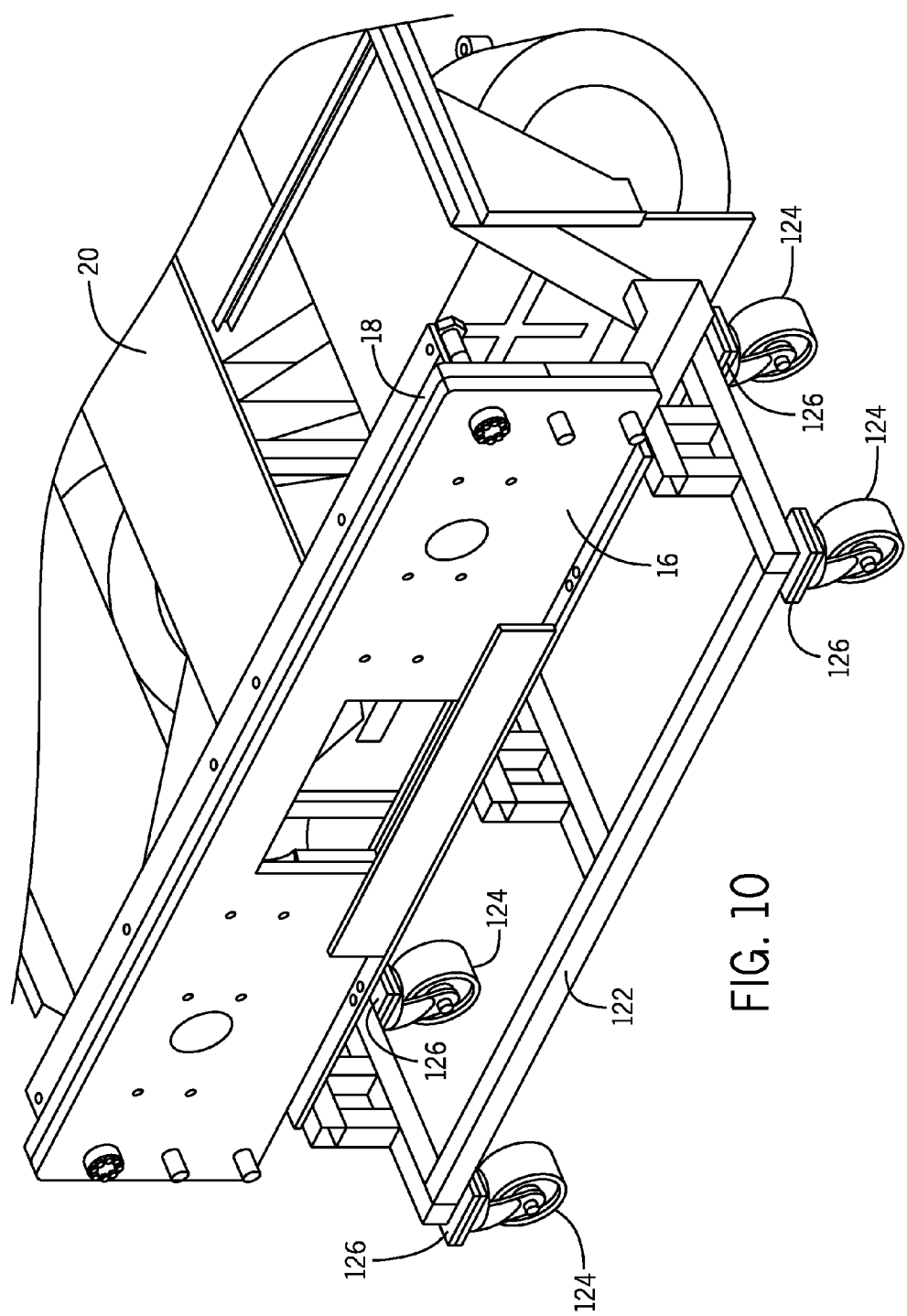
FIG. 10 is a schematic of an embodiment of an installation tool configured to support the docking system of FIG. 1 during an installation phase.

FIG. 10 is a schematic of an embodiment of an installation tool 122 configured to support the docking system 12 of FIG. 1 during an installation phase where the trailers 20, 26 are pre-aligned. As noted above, in certain embodiments, the turbine trailer 20 and the generator trailer 26 may be pre-aligned during an installation phase. The installation tool 122 may be a docking station dolly 122 comprising one or more clamps 124, one or more lockable casters 124, and one or more adjustment screws 126. The clamps 124 may be configured to support and/or hold the docking plates 16, 18 during the installation phase. For example, each docking plate 16, 18 may utilize two clamps 124 on the front surface and the back surface to support and hold the docking plate 16,18. The lockable caster 124 may be configured to transport the docking station dolly 122 with greater flexibility to the site of the docking process. The adjustment screws 126 on each of the lockable caster 124 may be configured to adjust the docking plates 16, 18 during the docking process.

Technical effects of the invention include a mechanical alignment system 14 and a mechanical docking system 12 configured to align a turbine trailer 28 with a generator trailer 30, and thus align (e.g., rotational shafts) of a turbine 28 on the trailer 20 with a generator 30 on the trailer 26. In some embodiments, the mechanical docking system 12 (e.g., docking station) may include the turbine docking plate 16 coupled to the turbine trailer 28 and a generator docking plate 18 coupled to the generator trailer 26. The turbine docking plate 16 may be coupled to a turbine trailer spine of a turbine trailer 20 via one or more mounting plates. Further, the generator docking plate 18 may include the one or more docking pins 24 (e.g., dowel pins) that engage with one or more openings 40 on the turbine docking plate 16 as the turbine trailer 20 moves in the reverse direction 39 to the stationary generator trailer 26. In some embodiments, the docking system 12 may include a static alignment reference frame 90 configured to provide a reference point for the alignment of the turbine trailer 20 and the generator trailer 26 during an installation phase of the trailers 20, 26. Accordingly, subsequent coupling of the turbine 28 and the generator 30 via the turbine trailer 20 and the generator trailer 26 during a commissioning phase may be done with high reliable alignment repeatability, increasing the flexibility of trailer systems and reducing the amount of downtime between alignment schedules. Further, subsequent coupling of the turbine 28 with the generator 30 during the commissioning phase (e.g. on the field) may not require additional alignment.

The mechanical alignment system 14 may be disposed within the turbine trailer spine 22 and may be configured to analyze and/or determine the alignment status of the turbine trailer 20 and/or the generator trailer 26. The mechanical alignment system 14 may include an internal spine laser system 44 and a rear camera 42. The internal spine laser system 44 may include the forward target camera 50, the laser 46, and the target 48. In some embodiments, the internal spine laser system 44 may be configured to analyze and/or determine whether the length 104 of the turbine trailer 20 is aligned with the generator trailer 26. The cameras 42, 50 may be communicatively coupled to the control system 53 and/or the computer 54, and may be configured to provide a visual of the system 10 components during the docking process, so that an engineer or a technician may adjust the system 10 components appropriately during the docking process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a docking guide, comprising:
a plurality of alignment guides, comprising:
first and second alignment guides configured to couple with a first mobile unit that supports a turbine engine; and
first and second mating alignment guide configured to couple with a second mobile unit that supports a generator, wherein the first and second alignment guides are configured to axially engage with the respective first and second mating alignment guides to guide a coupling between the first and second mobile units to help align the turbine engine with the generator;
wherein at least one alignment guide of the plurality of alignment guides comprises opposing tapered sides relative to a central axis of the at least one alignment guide.

2. The system of claim 1, comprising an alignment system configured to help align the coupling between the first mobile unit and the second mobile unit, wherein the alignment system comprises a laser configured to emit a beam of light to a target and a camera configured to capture a visual of the target.

3. The system of claim 2, comprising a control system configured to receive the visual of the target, wherein the visual comprises an alignment status of the coupling between the first mobile unit and the second mobile unit.

4. The system of claim 1, comprising a camera configured to monitor the docking guide during a docking procedure between the first and second mobile units.

5. The system of claim 1, wherein the first alignment guide and the first mating alignment guide are configured to couple together as a first pair and the second alignment guide and the second mating alignment guide are configured to couple together as a second pair, wherein each of the first and second pairs comprises a male alignment guide configured to mate with a female alignment guide.

6. The system of claim 5, wherein the male alignment guide comprises a pin and the female alignment guide comprises an opening.

7. The system of claim 6, wherein the pin comprises a tapered portion having the opposing tapered sides relative to the central axis.

8. The system of claim 1, further comprising the first mobile unit having the first and second alignment guides and the second mobile unit having the first and second mating alignment guides, wherein the first and second mobile units are configured to move toward one another in a direction while the first and second alignment guides are configured to axially engage with the respective first and second mating alignment guides in the direction to guide the coupling.

9. The system of claim 1, wherein the first and second alignment guides are configured to axially engage with the respective first and second mating alignment guides to guide the coupling between the first and second mobile units to help align a first rotational axis of a turbine shaft of the turbine engine with a second rotational axis of a generator shaft of the generator.

10. The system of claim 1, comprising an alignment frame having a rotational axis reference configured to provide a rotational axis reference to facilitate an alignment of a first rotational axis of a turbine shaft of the turbine engine and a second rotational axis of a generator shaft of the generator.

11. The system of claim 1, further comprising the turbine engine disposed on the first mobile unit, and the generator disposed on the second mobile unit, wherein the first and second mobile units are removably coupled together.

12. The system of claim 1, wherein at least two alignment guides of the plurality of alignment guides comprise the opposing tapered sides relative to the central axis of the respective alignment guide.

13. A system, comprising:
an alignment system configured to help align a coupling between a first mobile unit that supports a turbine engine and a second mobile unit that supports a generator, wherein the alignment system comprises a laser configured to emit a beam of light to a target and a camera configured to capture a visual of the target to evaluate an alignment of a structural portion of at least one of the first or second mobile units relative to a longitudinal axis of the at least one of the first or second mobile units.

14. The system of claim 13, wherein the evaluation of the alignment comprises an evaluation of a straightness of the structural portion along the longitudinal axis, a bending or bowing of the structural portion along the longitudinal axis, an angle of the structural portion relative to the longitudinal axis, or a combination thereof.

15. The system of claim 13, wherein the structural portion comprises a spine, the laser is configured to mount within a first region along the spine, the target and the camera are configured to mount within a second region along the spine, and the first and second regions are offset from one another by a distance along the spine.

16. The system of claim 13, wherein the laser is configured to emit a beam of light onto the target, and the camera is configured to obtain a visual of a position of the beam of light on the target as an indication of alignment of the structural portion relative to the longitudinal axis.

17. The system of claim 16, comprising a control system configured to receive the visual of the beam of light on the target, wherein the control system is configured to determine an alignment status of the structural portion relative to the longitudinal axis based on the position of the beam of light on the target.

18. The system of claim 13, comprising a docking guide comprising:
first and second alignment guides configured to couple with the first mobile unit; and
first and second mating alignment guides configured to couple with the second mobile unit, wherein the first and second alignment guides are configured to axially engage with the respective first and second mating alignment guides to guide the coupling between the first and second mobile units to help align a first rotational axis of the turbine engine with a second rotational axis of the generator.

19. A system, comprising:
a first mobile unit supporting a turbine engine;
a second mobile unit supporting a generator;
a docking guide comprising a first alignment guide coupled with the first mobile unit and a second alignment guide coupled with the second mobile unit, wherein the first and second alignment guides are configured to guide a coupling between the first and second mobile units to help align the turbine engine with the generator; and
an alignment system configured to help align the coupling between the first mobile unit and the second mobile unit, wherein the alignment system comprises a laser configured to emit a beam of light to a target and a camera configured to capture a visual of the target.

20. The system of claim 19, wherein the first mobile unit comprises a first trailer and the second mobile unit comprises a second trailer.

* * * * *